United States Patent [19]
Schuler

[11] 3,908,105
[45] Sept. 23, 1975

[54] VALVE MOUNTED PNEUMATIC TIRE PRESSURE SENSING SWITCH

[75] Inventor: Howard M. Schuler, Centerville, Ind.

[73] Assignee: Tyrechek Inc., Houston, Tex.

[22] Filed: May 20, 1974

[21] Appl. No.: 471,506

[52] U.S. Cl. .......... 200/61.25; 200/83 R; 200/83 S
[51] Int. Cl.² .................. B60C 23/02; H01H 35/24
[58] Field of Search .......... 200/61.22–61.25, 83 R, 200/83 B, 83 N, 83 S; 116/34; 340/58; 73/146.5, 146.8, 49

[56] References Cited
UNITED STATES PATENTS

| | | | |
|---|---|---|---|
| 2,296,411 | 9/1942 | Wills | 340/58 |
| 2,381,582 | 8/1945 | Erickson | 200/83 B |
| 2,727,221 | 12/1955 | Sprigg | 200/61.25 X |
| 2,798,130 | 7/1957 | Cox | 200/83 N |
| 3,252,135 | 5/1966 | Amundsen, Jr. | 340/58 |
| 3,423,552 | 1/1969 | Sipin | 200/83 B |
| 3,693,149 | 9/1972 | Johnston | 340/58 |
| 3,743,801 | 7/1973 | Brobeck et al. | 200/61.25 |
| 3,809,835 | 5/1974 | Watt | 200/83 N |

Primary Examiner—James R. Scott
Attorney, Agent, or Firm—Bertram H. Mann; Frank B. Pugsley

[57] ABSTRACT

A pressure sensing switch for use in a low pressure monitoring and warning system for a pneumatic tire comprising a housing and an improved dimpling metal dome therein, to provide a normally open pressure-sensitive switch, adapted for mounting as an extension to the valve stem of a pneumatic tire. The dimpling metal dome is mounted within the housing with its convex face in communication with the pressure in the pneumatic tire such that the dimpling of the dome will open the electrical contact whenever the tire pressure is above a predetermined norm. Means are provided in the side of the housing in electrical contact with the base and convex face of the dome in order to establish the switch circuit, and to provide for adjustment of the prestress force on the dome. Screw terminals are also provided for the external connection of electrical connecting wires to the remainder of the monitoring and warning system.

3 Claims, 5 Drawing Figures

US Patent  Sept. 23, 1975  3,908,105
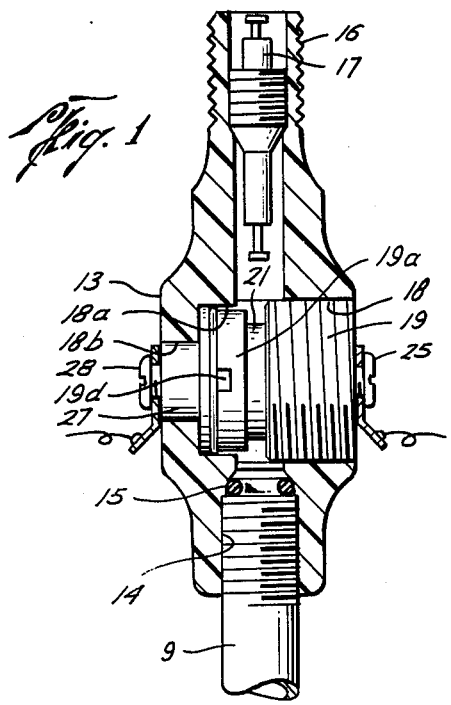
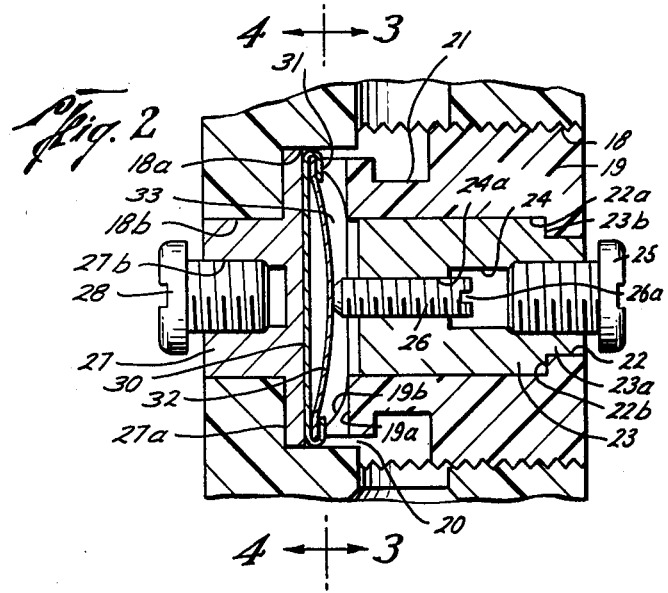
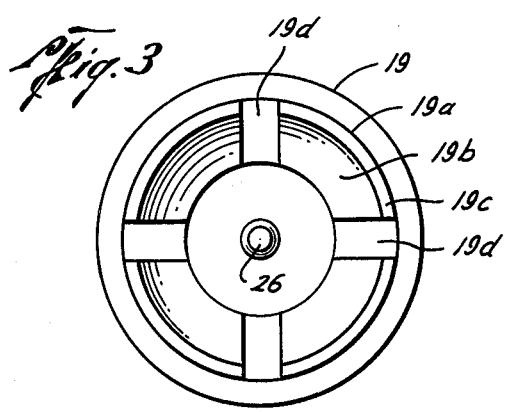
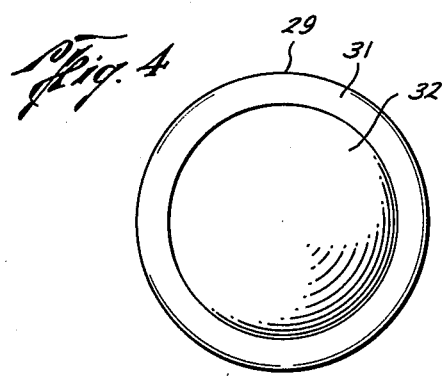
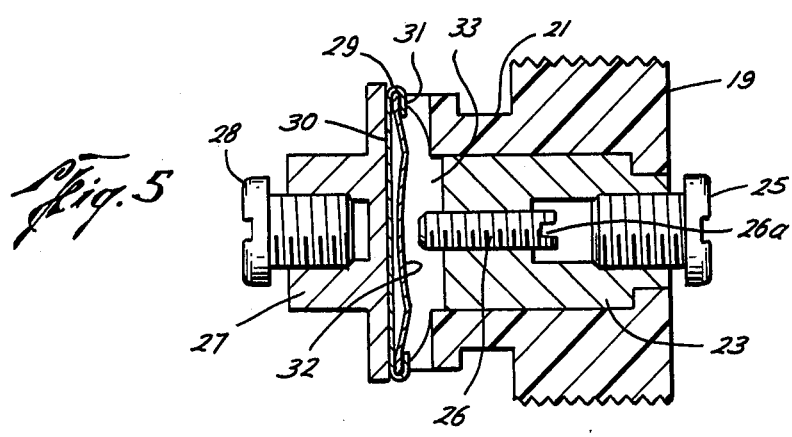

3,908,105

VALVE MOUNTED PNEUMATIC TIRE PRESSURE SENSING SWITCH

BACKGROUND OF THE INVENTION

Numerous prior patents have been granted on tire deflation devices. These devices include mechanisms mounted both inside the tire or externally connected to the valve stem or designed as an integral portion thereof. These prior devices have included mechanisms involving bellows, diaphragms, linkages, pistons, etc. Some provide for visual indication of pressure, while others operate as switches to provide an electrical indication. However, it is desirable to have a pressure sensing switch with no moving parts which is reliable, easy to manufacture, and inexpensive. Further, it is desirable for such a switch to be externally connected to the conventional valve stem of a pneumatic tire so that the switch may be installed, inspected and/or removed without the need for removing or otherwise modifying the tire or wheel, particularly in the case of tube-type tires.

The present invention is particularly adapted for use in a Pneumatic Tire Low Pressure Monitoring and Warning System as described generally in U.S. Pat. application Ser. No. 356,453, filed 2 May 1973, now abandoned, and includes an improvement of the dimpling metal dome pressure sensing switch of U.S. Pat. No. 3,743,801 to Brobeck et al, issued July 3, 1973.

SUMMARY OF THE INVENTION

Accordingly, it is an object of the present invention to provide an improved valve stem mounted pressure sensing switch.

It is a further object of the present invention to provide a pressure sensing switch using an improved dimpling metal dome pressure sensor.

It is a further object of the present invention to provide a pressure sensing switch for a pneumatic tire which may be installed, inspected, and/or removed without requiring the removal or modification of the pneumatic tire.

It is a further object of the present invention to provide a pressure sensing switch which mounts to the conventional valve stem of the pneumatic tire and forms an extension thereof, allowing for the tire to be refilled in the normal manner.

These objects and others are obtained by the herein-described device which comprises a sensing housing made from a suitable plastic such as Lexan which is internally threaded to screw on to the end of a conventional tire valve stem with the valve cap and core removed. The opposite end of the housing is internally threaded to accept a conventional tire valve core, and externally threaded to accept the valve stem cap. A pressure chamber in communication with the internal pressure of the pneumatic tire is provided within the housing, and an improved metal dimpling dome pressure sensing switch is mounted therein. Means are provided on the housing for connecting the switch controlled electrical wires, and for the adjustment of the prestress force on the dome to vary the pressure at which the switch will operate.

BRIEF DESCRIPTION OF THE DRAWINGS

In the accompanying drawings which illustrate the invention,

FIG. 1 is a longitudinal cross section of the pressure sensing switch and housing, with internal parts shown in relief.

FIG. 2 is an enlarged cross sectional view of a portion of the structure in FIG. 1.

FIG. 3 is a bottom view of the plastic plug from line 3—3.

FIG. 4 is a top view of the improved dimpling metal dome pressure sensing switch from line 4—4.

FIG. 5 is a cross section similar to FIG. 2 illustrating the dome in the dimpled state.

DETAILED DESCRIPTION OF AN EXEMPLARY EMBODIMENT

FIG. 1 shows the extremity of a conventional valve stem 9 for a pneumatic tire (not shown). The switch housing 13, preferably of a plastic material such as Lexan, has an internally threaded lower portion 14 adapted to be screwed onto stem 9 after removal of the valve cap. An O-ring 15 is interposed between the stem and housing for sealing purposes. The upper or opposite end 16 of the housing is internally and externally threaded to accept a standard short valve core 17 internally, and a valve cap (not shown) externally. The valve core normally mounted in stem 9 may be removed and utilized at 17. However, the valve core may be retained in its normal position in stem 9 and additional means provided on the lower portion of housing 13 to hold the valve core open when the switch body is in place.

Traversing housing 13 is an orifice 18 having leftwardly reduced portions 18a and 18b. Threadedly received in the right-hand portion 18 of the orifice is a plastic plug 19 with a reduced head 19a extending into intermediate orifice portion 18a with clearance 20 therearound. An annular recess 21 forms a neck between the main body and head portions of plug 19, 19a. Plug 19 also has an internal orifice with a reduced outer part 22 and an enlarged inner part 22a forming a shoulder 22b therebetween. A stepped metal plug 23, 23a is snugly received in orifice parts 22, 22a with its intermediate shoulder 23b lodged against orifice shoulder 22b. Plug 23, 23a, in turn, has an internal, longitudinally stepped orifice 24, 24a. A terminal screw 25 is threaded into the right-hand orifice end portion 24. An adjusting pin 26 is threadedly received in orifice portion 24a and extends leftwardly therebeyond, as will be explained.

The left end of plastic plug head portion 19a is concave, as at 19b, and forms a peripheral ridge 19c with one or more slots 19d.

The transverse orifice 18b in switch housing 13 extends leftwardly from reduced orifice portion 18a to the exterior of the housing. A metal plug 27 is snugly received in orifice 18b and has an inner flange 27a seated against the end wall of housing orifice portion 18a. A threaded orifice 27b is provided in the metal plug 27 for a second terminal screw 28.

Seated against the right-hand face of plug flange 27a is the pressure-sensitive diaphragm assembly, generally designated 29. The assembly includes metal base plate 30 with a peripheral lip or bead 31 which sealingly grips the periphery of a thin metal, dome-like diaphragm 32 and secures the same to base plate 30. Slotted ridge 19c on plastic plug head 19b bears against bead 31 and secures the diaphragm assembly in position. The space between the diaphragm and the confronting faces of plug portions 19a and 23 forms a pressure chamber 33 which communicates with the interior of valve stem 9 and the tire pressure through slots 19d in ridge 19c and clearance 20 around plug head 19a. Annular recess 21 between plug parts 19, 19a is aligned with and connects the interiors of housing parts 14 and 16 to permit tire filling and deflating air to bypass the switch parts.

The improved dimpling-type switch device 29 is similar to that more fully described and claimed in the aforementioned U.S. Pat. No. 3,743,801. In that patent, the base plate and metal dome or diaphragm are soldered together in order to provide a pressure-tight enclosure within the dome. The base plate is shaped to provide a stop for limiting the degree of dimpling. A first electrical contact is attached to the rim of the dome, and a second electrical contact is attached to a conducting ribbon opposite to the convex face of the dome. This conducting ribbon also serves to provide the prestress force to the dome.

In the present invention, the metal base plate is first formed as a shallow, circular cup with an outstanding peripheral flange 31. The concave side of the thin sheet metal diaphragm or dome is placed against the base plate and the flange is folded over the edge of the diaphragm and soldered thereto to provide a pressure-tight joint. The resulting configuration of the dome assembly is simpler and easier to manufacture than prior art switches and provides a superior switch action. In addition, the mounting of the dome assembly to function as a pressure switch is greatly facilitated.

The diaphragm 32, with sub-normal pressure applied, is disposed as in FIG. 2 with its central crest relaxed and engaging adjusting screw 26 to complete an electrical connection from a terminal screw 28, through metal plug 27, the diaphragm assembly 29, adjusting screw 26, and metal plug 23, 23a to terminal screw 25. Tire pressure is applied to pressure chamber 33 and the convex face of diaphragm 32 and, when such pressure is above a predetermined minimum, tends to depress or dimple the dome, as in FIG. 5, and thereby break the electrical connection between the terminal screws. The resistance of the diaphragm to dimpling action decreases as its crest is depressed, and this resistance may be adjusted by means of screw 26 which is provided with a screwdriver kerf 26a accessible when right-hand terminal screw 25 is removed. This has the effect of varying the low pressure condition at which contact is made for signalling such condition.

Operation

In operation, the switch housing of the preferred embodiment is first mounted on the valve stem after removal of the usual valve core and valve cap, which are then reapplied to the outer end portion 16 of the switch casing or housing. The switch is then connected in the monitoring system, for instance, as described in said abandoned application Ser. No. 356,453, filed May 2, 1973, by means of terminal screws 25 and 28. As long as the tire pressure is above the set low limit, the diaphragm will be dimpled and the switch will be open. However, should the tire pressure drop below the low pressure setting, the diaphragm will be relaxed so as to contact adjusting screw 26 and complete the energizing circuit to the monitoring system.

Due to the small size and weight of the novel switch, the mounting wheel may be readily counterbalanced by the usual wheel balancing weights, and no inordinate strain will be placed on the stem 9. The novel low pressure monitoring switch is particularly adapted accordingly, for mounting on the valve stem of a pneumatic tire. It has no moving parts and is rugged, inexpensive, and reliable. It is not necessary to remove the tire or tube to install or adjust the device. Various features may be modified as will occur to those skilled in the art, and the exclusive use of all modifications as come within the scope of the appended claims is contemplated.

What is claimed is:

1. A tire pressure sensing switch device for mounting on the valve stem of a pneumatic tire comprising
    a. a body having axially aligned, longitudinally spaced apart threaded apertures, respectively, for mounting on a tire valve stem and for receiving a valve core,
    b. an orifice extending through said body transversely of and between said apertures,
    c. a plug of insulating material received in one end portion of said orifice,
    d. an electrical terminal mounted in said plug and insulated thereby from said body,
    e. an annular shoulder at the other end of said orifice,
    f. a pressure chamber between said plug and said shoulder and communicating with said apertures,
    g. a thin metal, dimpling-type diaphragm traversing said chamber and secured against said shoulder,
    h. a contact element for electrically connecting said terminal and the flexing crest of said diaphragm in one position of the latter, and
    i. means for making constant electrical connection with said diaphragm to complete an electrical circuit through said terminal and said diaphragm crest in said one position thereof, said diaphragm crest being adapted to respond to changed pressure condition in said pressure chamber to separate said crest from said contact element and thereby break said circuit,
    j. said body being substantially symmetrical and balanced about the axis of said aligned apertures to minimize bending stresses applied to the supporting tire valve stem in operation.

2. A tire pressure sensing switch device as described in claim 1 in which said diaphragm crest is positioned to flex in the direction axially of said orifice, said contact element being threadedly mounted in said plug substantially coaxially with said diaphragm crest for adjustment of the diaphragm shape in said one position thereof.

3. A tire pressure sensing switch device as described in claim 1 in which said means for making constant electrical contact with said diaphragm comprises a closure in the end of said orifice opposite said plug, and further including a second terminal mounted in said closure and electrically connected to said diaphragm.

* * * * *